United States Patent
Guionnet

(10) Patent No.: US 8,611,852 B2
(45) Date of Patent: Dec. 17, 2013

(54) ADVICE OF PROMOTION FOR USAGE BASED SUBSCRIBERS

(75) Inventor: Jerome Guionnet, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/323,389

(22) Filed: Dec. 12, 2011

(65) Prior Publication Data

US 2013/0149995 A1    Jun. 13, 2013

(51) Int. Cl.
*H04W 4/26* (2009.01)
(52) U.S. Cl.
USPC ............................... 455/406; 455/405
(58) Field of Classification Search
USPC ................. 455/406, 405; 379/114.02
See application file for complete search history.

(56) References Cited

U.S. PATENT DOCUMENTS

| | | | | |
|---|---|---|---|---|
| 5,303,297 | A * | 4/1994 | Hillis ............................ | 455/406 |
| 6,865,262 | B1 * | 3/2005 | Mitts et al. ............... | 379/114.02 |
| 2002/0154751 | A1 | 10/2002 | Thompson, III et al. | |
| 2006/0030291 | A1 * | 2/2006 | Dawson et al. ............... | 455/405 |
| 2007/0053330 | A1 * | 3/2007 | Stafford et al. .............. | 370/338 |
| 2007/0202846 | A1 | 8/2007 | Marsh et al. | |
| 2008/0014904 | A1 * | 1/2008 | Crimi et al. .................. | 455/406 |
| 2008/0306834 | A1 | 12/2008 | Sayn et al. | |
| 2009/0137226 | A1 * | 5/2009 | Shan et al. ................... | 455/407 |
| 2010/0022232 | A1 * | 1/2010 | Bonner et al. ............... | 455/418 |
| 2010/0183132 | A1 * | 7/2010 | Satyavolu et al. ......... | 379/114.1 |
| 2010/0233995 | A1 | 9/2010 | Gopalaswamy et al. | |
| 2012/0064858 | A1 * | 3/2012 | Cai et al. ..................... | 455/406 |
| 2012/0276867 | A1 * | 11/2012 | Mcnamee et al. .......... | 455/406 |

OTHER PUBLICATIONS

International Search Report dated Feb. 15, 2013 for PCT/US2012/068758, filed Dec. 10, 2012.

* cited by examiner

*Primary Examiner* — Jinsong Hu
*Assistant Examiner* — Jean Chang
(74) *Attorney, Agent, or Firm* — Fliesler Meyer LLP

(57) ABSTRACT

Systems and method are described for providing advice of promotion to notify a subscriber about potential promotions that the subscriber would benefit from if he/she changed the context under which he/she plans to use a service. The process begins when a subscriber initiates a request to use the service, e.g. establish a call session. The operator identifies the subscriber by determining whether the subscriber is permitted to use the service, e.g. establish the session, and calculates a charge rate for the service usage, e.g. call session based on a usage plan associated with the subscriber. A rating engine is then invoked to identify a promotion that includes an additional rate that is different from the charge rate determined for the session. The promotion is identified based on parameters associated with the call session by determining which additional rate would apply if at least one of those parameters were modified.

16 Claims, 3 Drawing Sheets

ADVICE OF PROMOTION FOR USAGE BASED SUBSCRIBERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention generally relates to usage charging such as in wireless telecommunications and more particularly to billing systems and subscriber usage plans.

BACKGROUND

Cellular telephone plans and other usage based service plans often include promotions for the customers. For example, phone calls made after a certain hour, or during the weekend may be less expensive than phone calls made during regular business hours. Telecom operators and other service operators often define these promotions to encourage subscribers to use the services under the condition of promotions. For example, a telecom operator whose network is less loaded during the weekend may create weekend promotions to encourage their subscribers to make lower priority phone calls during the weekend, so as to offload the network during the week. The same example applies for an electricity provider or any other service provider.

Today, it is the responsibility of the subscribers to remember the conditions under which they can receive promotions. There exists an advice of charge mechanism to notify subscribers upfront regarding the cost of the usage of a service under the current condition (time of day, location, etc). With advice of charge, subscribers can be informed about the cost of the service usage before accessing that service. However, the advice of charge mechanism is generally not capable of advising the subscriber of potential promotions he could potentially benefit from.

SUMMARY

In accordance with various embodiments of the invention, systems and method are described for providing advice of promotion which can be used to notify a subscriber about potential promotions that the subscriber would benefit from if he/she changed the context under which he/she plan to use a service. For a wireless subscriber, the process begins when a subscriber first initiates a request to use a service (e.g., establish a call session) by using a device such as a wireless device. The request is received by the telecom operator. The operator systems identify the subscriber by determining whether the subscriber is permitted to use the service. In addition, the systems determine a charge rate for the service usage based on a plan associated with the subscriber using a rating engine. As the rating engine is invoked to identify the rate for the usage, it can also calculate the rate for another set of parameters associated with the service usage and determining which additional rate would apply if at least one of those parameters were modified. If a different rate is identified, the operator can then transmit a response to the subscriber that includes information about the promotion identified by the rating engine. This information can be used to notify the subscriber of the additional promotions he/she could benefit if he/she changed its usage condition.

DETAILED DESCRIPTION

Figure 1:
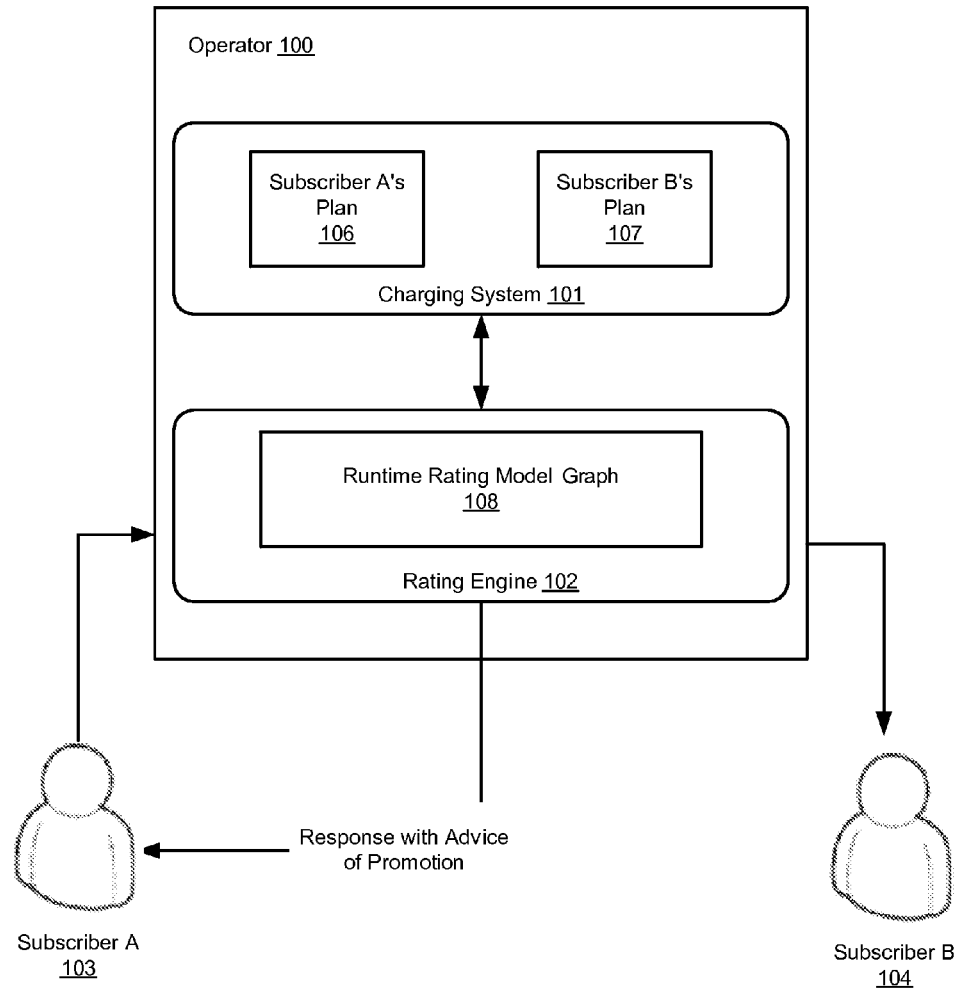
FIG. 1 is an illustration of a system that provides advice of promotion, in accordance with various embodiments of the invention.

In accordance with various embodiments of the invention, techniques are described which can be used to analyze the current context under which a subscriber is planning to use a service (e.g. plans to make a telephone call) in order to not only notify that subscriber about charges, but to also notify of potential promotions that the subscriber would benefit from if he/she changed the context under which he/she plan to use the service.

By way of illustration, a subscriber may be signed up for a price plan where phone calls cost 5 cents/minute before 6:00 PM and 1 cent/minute after 6:00 PM. If the subscriber is planning to make a phone call at 5:55 PM, the system would notify the subscriber that the cost of making this call at the current moment is 5 cts/min (advice of charge), and, additionally that in 5 minutes from now (at 6:00 PM) it would cost only 1 cts/min (advice of promotion).

As another illustration, a subscriber may be signed up for a price plan where phone calls cost 5 cents/minute except for calls made from non busy locations (e.g. where cell towers are under used). If a subscriber to this price plan is planning on making a phone call, the system would notify the subscriber that the cost of making this call at the current moment is 5 cts/min (advice of charge), but in addition that if this call was made from another location near by, such as from an adjacent cell, then the call would cost only 2 cts/min.

In this manner, the advice of promotion system provides an improved user experience and enables the subscriber to better control the charges and phone plan.

In accordance with an embodiment, the system can include a rating engine that can be instructed to calculate alternative rate(s) by varying the context of the usage. The rating engine runtime rating model is a graph, whose nodes are conditions and leaves are the rates. The conditions and the rates are derived from the rate plan information and include reference to the context (subscriber data, usage data) that provides values for evaluating the conditions. When the rating engine processes a request, the rating graph is executed against the usage current context which efficiently leads to the determination of the rate for this context. The enhancement to the rating engine is to instruct it to evaluate alternative acceptable condition changes that will lead to different rate.

When the rating engine processes a service usage request, it executes the rules in the context of the current usage request. In accordance with an embodiment, the context includes but is not limited to (1) parameters of the request (type, quantity, etc.); (2) parameters of the customer/subscriber (tariffs, price plans, accumulated usage, contracts, etc.); and (3) other parameters (time-of-day, taxes, etc.).

The conditions that are under the control of the end user (time of the call, location, etc), are tags and their acceptable variations are configured, so during the evaluation of the conditions, the rating engine detects the one that could lead to different rates and evaluate them. If any better alternative rate under the changed conditions is calculated, the new rate(s) and the service usage condition(s) would be used to advise the user of a promotion about the service to be rendered. It should be noted that this advice of promotion could be calculated and used before, during and after a service has been rendered.

FIG. 1 is an illustration of a system that provides advice of promotion, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a telecom operator 100 can provide telephone as well as other services to a number of subscribers (103, 104). Each subscriber typically has a usage plan (106, 107) or some charge rates associated with them. When one subscriber 103 initiates a telephone call to another subscriber, the operator will typically identify the subscriber by determining whether that particular subscriber is permitted to establish the call session. In addition, the operator will determine a charge rate for the call session based on the usage plan 106 associated with the subscriber 103.

In accordance with an embodiment, the operator can deploy a rating engine 102 that can be used to identify various additional promotions for the subscriber. The additional promotions may include different rates from the charge rate determined for the session being requested by the subscriber. The rating engine can employ a runtime rating model 108 to identify the promotion(s) by analyzing a set of parameters associated with the call session and determining which additional rate would apply if at least one of those parameters were modified. Once the promotion has been identified, it can be attached to the response transmitted to the subscriber that is requesting the call session. The response can include information about the promotion identified by the rating engine, which can be used to notify the subscriber using the device (e.g., a wireless device).

Figure 2:
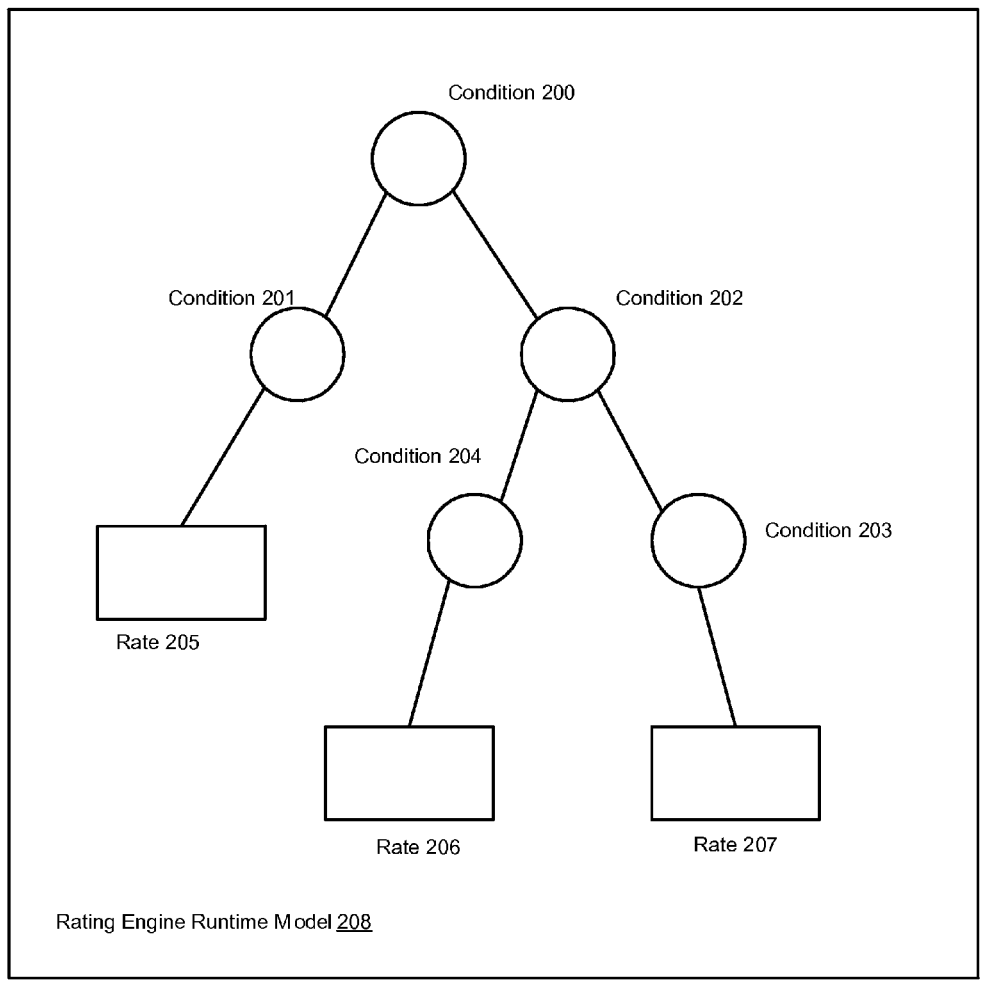
FIG. 2 is an illustration of the runtime rating model graph used by the rating engine, in accordance with various embodiments of the invention.

FIG. 2 is an illustration of the runtime rating model graph used by the rating engine, in accordance with various embodiments of the invention. As illustrated, the runtime rating model can be a graph 208 whose nodes (200-204) are conditions and leaves (205-207) are the rates. The conditions and the rates are derived from the rate plan information and include reference to the context (subscriber data, usage data) that provides values for evaluating the conditions. When the rating engine processes a request, the rating graph is executed against the usage current context which efficiently leads to the determination of the rate for this context. The rating engine can be instructed to evaluate alternative acceptable condition changes that will lead to a different rate(s).

Figure 3:
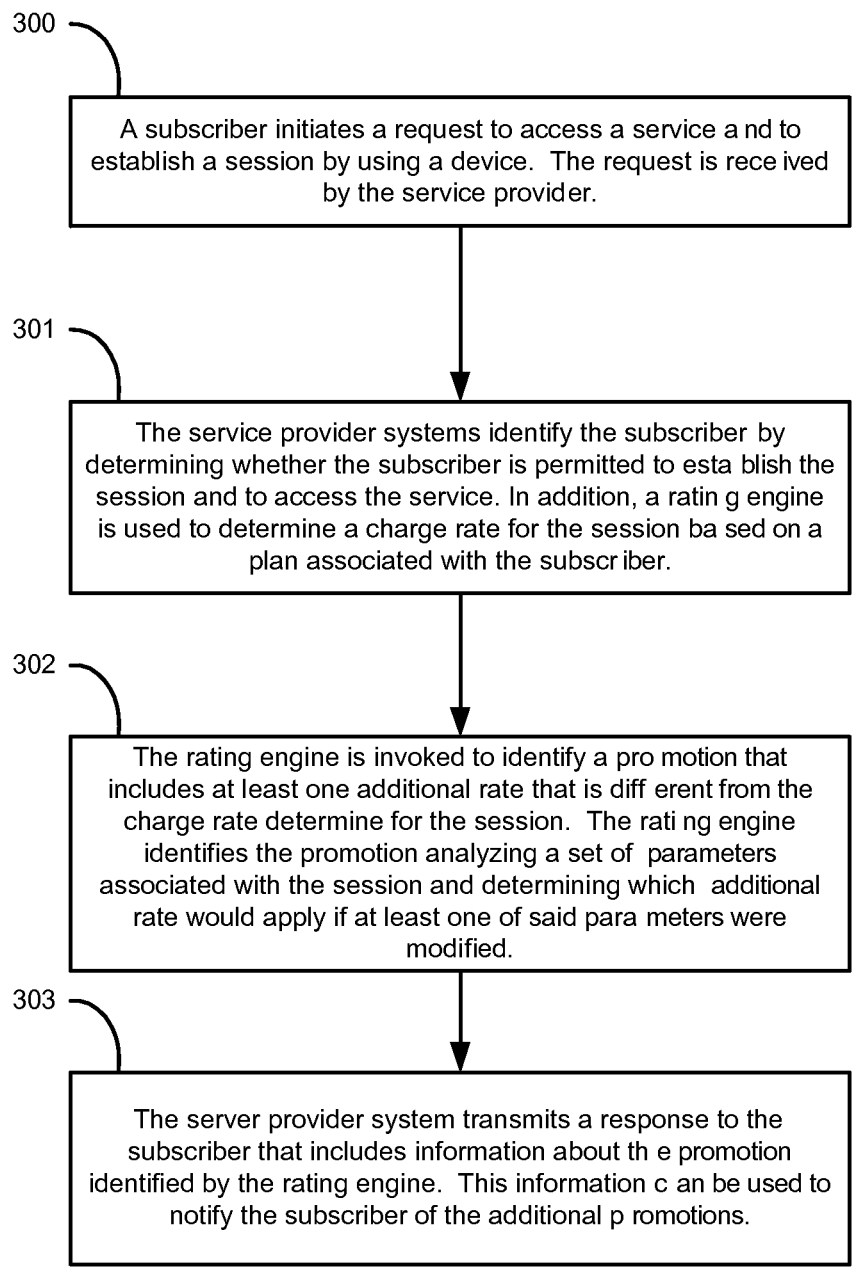
FIG. 3 is a flow chart illustration of a process for providing advice of promotion, in accordance with various embodiments of the invention.

FIG. 3 is a flow chart illustration of a process for providing advice of promotion, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, a subscriber first initiates a request to establish a call session by using a device (e.g., a wireless device). The request is received by the telecom operator. In step 301, the operator identifies the subscriber by determining whether the subscriber is permitted to establish the call session. In addition, the operator determines a charge rate for the call session based on a plan associated with the subscriber. In step 302, a rating engine is invoked to identify a promotion that includes at least one additional rate that is different from the charge rate determined for the session. The rating engine identifies the promotion analyzing a set of parameters associated with the call session and determining which additional rate would apply if at least one of said parameters were modified. In step 303, the operator transmits a response to the subscriber that includes information about the promotion identified by the rating engine. This information can be used to notify the subscriber of the additional promotions.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing advice of promotion in a service delivery environment, the method comprising:
   receiving a request to render a service from a subscriber using a device;
   identifying the subscriber by determining whether the subscriber is permitted to access the service and using a rating engine to determine a charge rate for the request based on a rate plan associated with the subscriber, wherein the rating engine includes a runtime rating model that takes as parameters a type, a quantity, a time and a location of the request;
   invoking the rating engine to identify a promotion by
      varying each and a different combination of said parameters of the runtime rating model, to generate a plurality of additional charge rates,
      identifying, from the plurality of additional charge rates, at least one charge rate which is different from the charge rate initially determined for the request; and
   transmitting the promotion including the at least one charge rate and the one or more varied parameters associated therewith to the subscriber in a response to the request, before the service is rendered.

2. The method of claim 1, wherein the runtime rating model is a graph, the graph containing a set of conditions as nodes and a set of rates as leaves of the graph.

3. The method of claim 1, wherein the rating engine identifies said promotion by employing information from the plan associated with the subscriber.

4. The method of claim 1, wherein the rate plan associated with the subscriber is stored in a charging system.

5. The method of claim 1, further comprising:
   notifying the subscriber of the promotion by using the device for the subscriber.

6. The method of claim 1, wherein the parameters further include one or more of tariffs, price plans, taxes, accumulated usage, and contracts.

7. The method of claim 1, wherein the at least one charge rate associated with the promotion is lower than the charge rate determined for the request.

8. The method of claim 1, wherein the rating engine functions in combination with advice of a charge rating engine.

9. A system for providing advice of promotion in a telecommunications environment, the system comprising a physical storage memory and one or more hardware processors that execute instructions stored in the storage memory to perform a method comprising:
   receiving a request to render a service from a subscriber using a device;
   identifying the subscriber by determining whether the subscriber is permitted to access the service and using a rating engine to determine a charge rate for the request based on a rate plan associated with the subscriber, wherein the rating engine includes a runtime rating model that takes as parameters a type, a quantity, a time and a location of the request;
   invoking the rating engine to identify a promotion by
      varying each and a different combination of said parameters of the runtime rating model, to generate a plurality of additional charge rates,
      identifying, from the plurality of additional charge rates, at least one charge rate which is different from the charge rate initially determined for the request; and
   transmitting the promotion including the at least one charge rate and the one or more varied parameters associated therewith to the subscriber in a response to the request, before the service is rendered.

10. The system of claim 9, wherein the runtime rating model is a graph, the graph containing a set of conditions as nodes and a set of rates as leaves of the graph.

11. The system of claim 9, wherein the rating engine identifies said promotion by employing information from the plan associated with subscriber.

12. The system of claim 9, wherein the rate plan associated with the subscriber is stored in a charging system.

13. The system of claim 9, further comprising:
   notifying the subscriber of said promotion by using the device for the subscriber.

14. The system of claim 9, wherein the parameters further include one or more of tariffs, price plans, taxes, accumulated usage, and contracts.

15. The system of claim 9, wherein the additional rate associated with the promotion is lower than the charge rate determined for the request.

16. A non-transitory computer readable storage medium storing a set of instructions executable by one or more processors to perform a method comprising:
   receiving a request to render a service from a subscriber using a device;
   identifying the subscriber by determining whether the subscriber is permitted to access the service and using a rating engine to determine a charge rate for the request based on a rate plan associated with the subscriber, wherein the rating engine includes a runtime rating model that takes as parameters a type, a quantity, a time and a location of the request;
   invoking the rating engine to identify a promotion by
      varying each and a different combination of said parameters of the runtime rating model, to generate a plurality of additional charge rates,
      identifying, from the plurality of additional charge rates, at least one charge rate which is different from the charge rate initially determined for the request; and
   transmitting the promotion including the at least one charge rate and the one or more varied parameters associated therewith to the subscriber in a response to the request, before the service is rendered.

* * * * *

UNITED STATES PATENT AND TRADEMARK OFFICE
CERTIFICATE OF CORRECTION

Page 1 of 2

PATENT NO. : 8,611,852 B2
APPLICATION NO. : 13/323389
DATED : December 17, 2013
INVENTOR(S) : Guionnet It is certified that error appears in the above-identified patent and that said Letters Patent is hereby corrected as shown below:

In the Drawings

On sheet 3 of 3, in figure 3, under reference numeral 300, line 1, delete "a nd" and insert -- and --, therefor.

On sheet 3 of 3, in figure 3, under reference numeral 300, line 2, delete "rece ived" and insert -- received --, therefor.

On sheet 3 of 3, in figure 3, under reference numeral 301, line 2, delete "esta blish" and insert -- establish --, therefor.

On sheet 3 of 3, in figure 3, under reference numeral 301, line 3, delete "ratin g" and insert -- rating --, therefor.

On sheet 3 of 3, in figure 3, under reference numeral 301, line 4, delete "ba sed" and insert -- based --, therefor.

On sheet 3 of 3, in figure 3, under reference numeral 301, line 5, delete "subscri ber." and insert -- subscriber. --, therefor.

On sheet 3 of 3, in figure 3, under reference numeral 302, line 1, delete "pro motion" and insert -- promotion --, therefor.

On sheet 3 of 3, in figure 3, under reference numeral 302, line 2, delete "diff erent" and insert -- different --, therefor.

On sheet 3 of 3, in figure 3, under reference numeral 302, line 3, delete "rati ng" and insert -- rating --, therefor.

Signed and Sealed this
Fifteenth Day of July, 2014

Michelle K. Lee
*Deputy Director of the United States Patent and Trademark Office*

On sheet 3 of 3, in figure 3, under reference numeral 302, line 6, delete "para meters" and insert -- parameters --, therefor.

On sheet 3 of 3, in figure 3, under reference numeral 303, line 2, delete "th e" and insert -- the --, therefor.

On sheet 3 of 3, in figure 3, under reference numeral 303, line 3, delete "c an" and insert -- can --, therefor.

On sheet 3 of 3, in figure 3, under reference numeral 303, line 4, delete "p romotions." and insert -- promotions. --, therefor.